3,025,264
RESIN PRODUCTION
Kenneth R. Lind, 2309 Avalon Drive,
Sacramento 25, Calif.
No Drawing. Filed May 20, 1959, Ser. No. 814,651
9 Claims. (Cl. 260—47)
(Granted under Title 35, U.S. Code (1952), sec. 266)

The invention described herein may be manufactured and used by or for the United States Government for governmental purposes without payment to me of any royalty thereon.

The invention relates to the formation of resins and is more particularly concerned with producing resins which are capable of being pressure molded. More specifically, my invention involves the chlorination-induced polymerization of either pure or mixed cresol isomers.

The resins formed by the novel process of this invention are quite similar in many respects to the phenol-formaldehyde resins commonly known by the trade name Bakelite. The creson polymers are susceptible to pressure molding under approximately the same conditions of filler, temperature and pressure as are those resins presently in use. The short chain polymers of the invention can be useful as either paint or varnish resin. Further, due to their high chlorine content, they show great potentiality as bases for fungicidal, bactericidal and insect repellent varnish. The resins produced by this invention are interchangeable with the Bakelite type in most applications. On the basis of economy, they are preferable because the reaction materials are considerably less expensive.

Accordingly, my invention contemplates the production of a polymeric, resinous substance formed from isomeric cresols in the presence of strong aqueous alkalis. The degree of polymerization may be controlled by varying the quantity and concentration of the alkali solution. Products ranging from highly chlorinated liquids to low-chlorine, solid, cross-linked resins are obtainable.

Thus it is a primary object of my invention to provide a novel polymeric resin.

More specifically, it is an object of the invention to provide such a resin in which the degree of polymerization may be easily controlled.

Still another object of the invention is to provide a resin of the pressure-molding type which is simpler and less expensive to produce than resins now in use.

The invention will be more fully understood by reference to the following examples and description. These examples, however, are given for the purpose of illustration only, and are not to be construed as limiting the scope of the present invention in any way.

The reaction is carried out in an aqueous solution at atmospheric pressure. Cresol is dissolved in an aqueous solution of sodium hydroxide or other alkali. Chlorination of the solution is carried out, preferably with mechanical agitation, at a chlorination rate which maintains the exothermally reacting mixture at a point just below violent boiling. The container should best be closed to allow condensation of any vaporized water.

The sodium hydroxide solution may be of a concentration of from 5 to 50% by weight. The preferred range is from about 5 to 35% by weight. The ratio of sodium hydroxide to cresol ranges from 1:1 to 1:6. The mechanical agitation during chlorination is not absolutely necessary, but it does result in a more consistent end product. Chlorination may be terminated before the formation of the resinous product. Such prior termination leads to a viscous, varnish-like resin, the viscosity increasing with the chlorination time.

Once formed, the resin is readily removed by repeated washing with hot water followed by decantation, filtration or other known steps. The resin is finally treated by heat and pressure, usually with a filler added, in the same manner as the phenol-formaldehydes.

Chlorination of the meta and ortho isomers to reaction completion in the presence of strong aqueous alkali yields solid resins which may be washed, dried, powdered, mixed with suitable fillers, and pressure molded to hard, thermosetting plastics. Less polymerization (by controlled alkalinity) yields semi-liquid to semi-solid masses potentially valuable for paint and varnish use. Polymerization of isomeric mixtures yields a solid to semi-solid polymer probably due to linkage between the various cresol isomers, and this polymer may also be pressure molded. There is also formed a brownish substance, alkali soluble, which exhibits the properties of a fatty acid, yielding lather in alkali solution, separation of solid upon acidification, and resaponification with alkali. This is also probably due to inter-reaction between the isomers and consists, most likely, of short chain polymers having formed carboxylic acid groups (similar to phenol). This soap forming fatty acid also appears to have potential industrial application.

The isomers of cresol singly and in combination yield different results upon hyper-chlorination under the same conditions, and yield different end products depending upon alkali concentration of the alkali. Para-cresol alone in 20% alkali solution has been noted to yield a compound which is partly water soluble and has an odor of pinene. In more concentrated alkali solution a dark viscous mass is formed which, with still more alkali, is almost completely digested to a water soluble compound. Ortho-cresol in strong alkali solution of from 20 to 50% concentration with excess chlorine yields a dark brown polymer suitable for pressure molding or paint and varnish uses depending upon the degree of polymerization. Meta cresol under the above conditions finally yields a light tan, solid, powdery resin with excellent molding properties. Lesser degrees of polymerization are attainable by control of alkalinity. Chlorination of mixed isomeric cresols yields finally a brown, semi-solid polymer and a brown soapy liquid, separable by filtration or centrifugal action. Separation of the solid yields a pressure molding resin, and the brown solution exhibits the common properties of a fatty acid soap solution.

The following are specific examples indicating the use of various cresols in solutions of different concentrations.

*Example I*

To 320 milliliters of water in a one liter flask, add 80 grams of NaOH and dissolve. To this mixture add 25 grams of cresylic acid and heat to 200° F. Now chlorinate the mixture through a capillary tube of one milliliter orifice and suitable length. Chlorination should take place at the rate of about 100 grams of chlorine per hour for one hour. This rate generally represents a steady stream of bubbles through the solution. The end of the reaction will be apparent by the formation of a separated resinous mass and semi-clarification of the aqueous phase. When the reaction is completed, decant and discard the aqueous phase. The resin is now washed three times with 5% hydrochloric acid, adding about 200 milliliters of acid: Then heat in a steam bath for about fifteen minutes, and decant the acid. After washing, the resin is dried at about 210° F. The resin may then be powdered in a mortar and mixed with three parts wood flour as a filler. It may now be formed in a plastic press at about 2000 p.s.i. at 300° F. for about one minute. The use of a mold release agent is suggested.

*Example II*

To 400 milliliters of water in a one liter flask, add 100 grams of NaOH and dissolve. Now add 50 grams of ortho-cresol to the above mixture and heat to 200° F. Chlorinate this latter mixture at the rate suggested in Example I. This may be done through a fritted glass impinger tube. The rate should be adjusted so that the reaction proceeds at the maximum possible rate without losing solution from the containing vessel. During this reaction the solution should be rapidly agitated. This provides a better contact between the two liquid phases and the chlorine when separation begins to concur. Reaction completion is indicated by the formation of a yellow orange, spongy resinous material which is somewhat soft at the temperature of reaction, but which becomes a solid brittle resin very similar in appearance to phenolic resins after cooling. The product resin may then be separated, washed, dried and further processed in the manner previously described.

*Example III*

To 400 milliliters of water in a one liter flask, add 100 grams of NaOH. To the above mixture add 50 grams of meta-cresol and heat to about 200° F. The mixture is then chlorinated for about one hour. If a shorter chain polymer is desired, chlorination should be stopped sooner. The reaction product is then separated and treated in the above described manner.

*Example IV*

To 400 milliliters of water in a one liter flask, add 100 grams of NaOH. To the above solution add 50 grams of para-cresol and heat to 200° F. Chlorination and separation of the resin will again yield a product which may be pressure molded.

*Example V*

To 400 milliliters of water in a one liter flask, add 100 grams of NaOH. Three such solutions were prepared and 10 grams of a different one of the cresol isomers was added to each. The mixtures were then heated and chlorinated. The reaction product in each case was a pressure molding resin similar in character to a phenol formaldehyde resin.

*Example VI*

To 400 milliliters of water in a one liter flask, add 100 grams of NaOH. To the above mixture add 10 grams of cresylic acid. This may be formed from the mixed isomers of cresol of either petroleum or coal tar origin. The resultant solution is then heated and processed in the manner described above to yield a pressure molding resin. All reactions are exothermal, and cooling of the resinous product by external means should be avoided. The reaction seems to be more rapid and complete if about one to two grams of potassium chlorate or sodium chlorate is added about midway through the chlorination.

It is probable that the polymerization reactions which were observed occur due to linkage through the cresylic methyl groups to a hydrogen position on another benzene ring. Since metacresol has three active hydrogens (due to ortho-para directing properties of both the hydroxyl and methyl groups), the following reaction in the case of meta-cresol seems a logical explanation for the polymerization. It is somewhat analogous to the reaction proposed for phenol-formaldehyde polymerization. The final theorized product would be a highly cross-linked polymer practically undiscernable from Bakelite, and such a product is actually formed.

The following reaction is considered most likely:

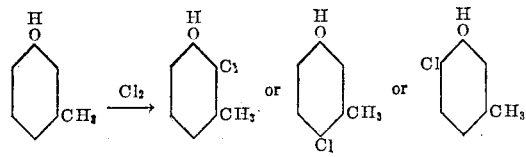

Any of the above reaction products, due to enol-keto resonance, would undergo the following type reaction:

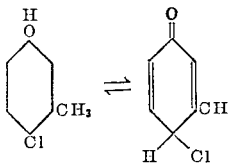

The above keto form, in the presence of strong alkali, would be capable of HCl elimination, with subsequent coupling between the methyl group of one cresol molecule to an active hydrogen of another.

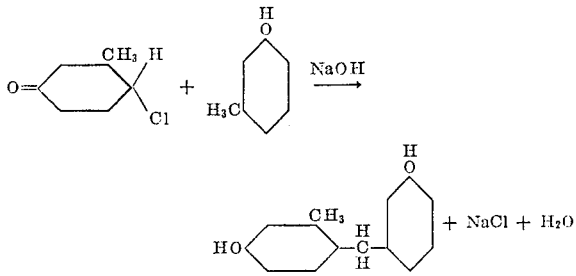

The above polymerization should continue until the chain length prohibits keto-enol resonance. Very high caustic concentrations become more necessary in order to upset the equilibrium of the resonance reaction. Under appropriate conditions, crosslinked polymers of the following three dimensional form should result:

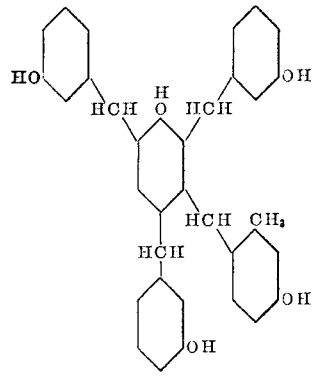

Ortho-cresol undergoes the above reaction, however, to a lesser extent than the meta isomer, and para-cresol to a still lesser extent. Competition between the hydroxyl and methyl ortho-para directing groups probably explains the lower reactivities. Both ortho and para, and especially the latter, could react to form a quinone structure and thence a dicarboxylic acid, in a reaction analogous to that for the chlorination of phenol to maleic acid. This acid forming tendency could explain the fatty acid properties of the mixed isomer chlorination product, by the assumption that at some stage of polymerization, quinonization of a para group occurs, finally yielding carboxyl groups on a short chain polymer. Para-cresol alone appears capable of almost immediate quinone structure formation. The fatty acid noted when mixed isomers are reacted may indicate linkage between ortho and/or meta-cresol and para-cresol, with subsequent formation of carboxyl groups from the para isomer.

It is not intended that the invention described above be limited to any of the specific examples given nor unnecessarily by any theory as to the mode of operation, but only by the appended claims by which it is intended to claim all novelty inherent in the invention.

What is claimed is:

1. A process for producing pressure moldable resins comprising the steps of heating to a temperature of about 200° F. a mixture of (1) an aqueous alkali solution having an alkali concentration of from 5 to 50 percent by weight of said solution and (2) a material selected from the group consisting of para-cresol, meta-cresol, ortho-cresol and cresylic acid; introducing chlorine into said mixture at the rate of about one hundred grams per hour and continuing said chlorine introduction for a period of time sufficient to produce a resinous mass.

2. A process in accordance with claim 1 wherein said alkali and said material are present in the ratio of 1:1 to 1:6.

3. A process in accordance with claim 1 wherein said alkali concentration is from about 5 percent to 35 percent by weight of said solution.

4. A process in accordance with claim 1 which includes the additional step of adding one to two grams of a catalyst selected from the group consisting of sodium chlorate and potassium chlorate about midway through said chlorine introduction.

5. A process for producing pressure moldable resins comprising the steps of heating to a temperature of about 200° F. a mixture (1) an aqueous sodium hydroxide solution having a sodium hydroxide concentration of about 20 percent by weight of said solution and (2) a material selected from the group consisting of para-cresol, ortho-cresol, meta-cresol and cresylic acid; introducing chlorine into said mixture at the rate of about one hundred grams per hour and continuing said chlorine introduction for a period of time sufficient to produce a resinous mass.

6. A process in accordance with claim 5 wherein said material is ortho-cresol.

7. A process in accordance with claim 5 wherein said material is para-cresol.

8. A process in accordance with claim 5 wherein said material is meta-cresol.

9. A process in accordance with claim 5 wherein said material is cresylic acid.

References Cited in the file of this patent
UNITED STATES PATENTS

| | | |
|---|---|---|
| 2,494,993 | Foster | Jan. 17, 1950 |
| 2,659,759 | Zemba | Dec. 26, 1950 |

FOREIGN PATENTS

| | | |
|---|---|---|
| 355,173 | Germany | June 21, 1922 |
| 355,174 | Germany | June 21, 1922 |

OTHER REFERENCES

Hackh's Chemical Dictionary, 3rd. edition, The Blackistan Co., Phila., 1944, p. 232.